2,871,749

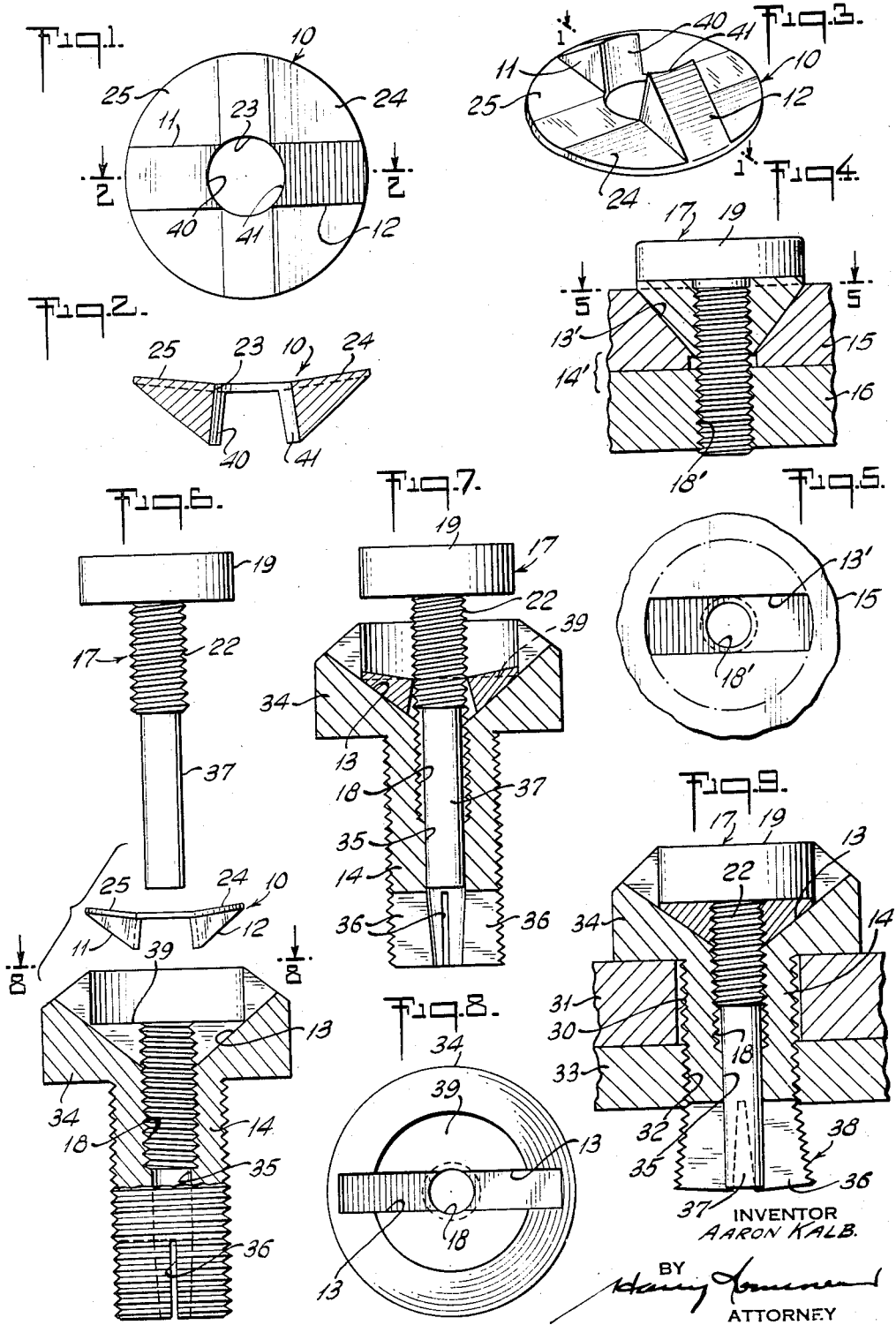

BLIND FASTENER HAVING LOCKING STEM RETAINED IN HEAD BY CAMMED LOCK WASHER

Aaron Kalb, Irvington, N. J.

Application May 25, 1955, Serial No. 511,009

4 Claims. (Cl. 85—2)

This invention relates to improvements in locking devices, and is more particularly directed to a self-locking fastener device having novel structural features, hereinafter more particularly described, such that the device will become automatically locked as it is threaded into the threaded aperture or other member in connection with which it is used. The device of this invention comprises a plate member having dependent protuberances so formed that, as the fastener member is threaded into fastening position, the protuberances will interlock with the threads of said fastener member and the parts will be thus automatically self-locked against accidental displacement. A further important feature of the invention is that it is vibration-proof. The device is useful for the infinite variety of applications and uses for which screws, bolts and the like, are useful, as will become apparent from a consideration of the description below and the appended drawings, and is highly reliable, efficient and practical in operation.

In the use of the device of the invention insertion and locking is all done from the front side eliminating the problem of rear accessory locking members, and eliminating use of nuts, lock washers and the like. Thus, the need for clearance for installation of shake-proof nuts, and bucking bars, etc., is eliminated and a saving of space is effected. The device further eliminates the need for and cost of handling of additional or second parts such as a separate shake-proof nut.

These and other advantageous objects, which will appear from the drawings and from the description hereinafter, are accomplished by the structure of my invention, of which an embodiment is illustrated in the drawings. It will be apparent, from a consideration of said drawings and the following description, that the invention may be embodied in other forms suggested thereby, and such other forms as come within the scope of the appended claims are to be considered within the scope and purview of the instant invention.

In the drawings:

Fig. 1 is a bottom plan view of a plate member embodying the invention, taken on line 1—1 of Fig. 3, Fig. 2 is a vertical sectional view thereof, taken on line 2—2 of Fig. 1, Fig. 3 is a perspective bottom view thereof, Fig. 4 is a vertical sectional view of a form of the invention useful in securing two articles together, Fig. 5 is a horizontal sectional view thereof, taken on line 5—5 of Fig. 4, Fig. 6 is an exploded, elevational, partly sectional view, showing the manner in which the invention may be applied to an expansible member, Fig. 7 is a partially assembled vertical sectional view of the parts shown in Fig. 6, Fig. 8 is a top plan view taken on line 8—8 of Fig. 6, and Fig. 9 is an assembled vertical sectional view of the parts shown in Fig. 6.

As shown in the drawings, the device of this invention comprises a flat plate 10 having a pair of protuberances 11, 12 dependently disposed on one face thereof in aligned, spaced relation. The protuberances are preferably made of compressible material, such as fiber or the like, and are proportioned for reception in a slotted portion 13 of a member 14 (Fig. 7) or the slotted portion 13' of an aggregate unit 14' such as articles 15, 16 into which the fastener 17, such as a screw, bolt or the like, may be threaded either by a self-tapping arrangement, or to engage a previously threaded portion 18' in the aggregate unit 14' such as that of Fig. 4 or threaded portion 18 in unit 14 of Fig. 6. The fastener 17 has a head 19 of greater cross section than the stem portion 22 thereof. The protuberances 11, 12 of the plate 10 are preferably proportioned to conform to the slotted portion 13' of Fig. 4 and 13 of Fig. 6 for reception therein. An aperture 23 is provided in the plate 10 intermediate the protuberances 11, 12 for reception of the stem portion 22 of the fastener 17.

The device is used as follows: The plate 10 is positioned on the slotted member (such as 34 or 15) in connection with which the device is to be used with the protuberances 11, 12 of the plate disposed in said slotted portion. The stem 22 of the fastener is passed through the medial aperture 23 of the plate 10 and threaded into section 18' of Fig. 4, or 18 of Fig. 6. The fastener head is thus brought down against the plate 10, compressing the plate protuberances in the slotted portion and against the threaded portion 22 of the fastener 17, interlocking therewith (Figs. 4 and 9) and thus locking the fastener in position.

To enhance this action, the plate may, as shown in Figs. 2 and 7, be bent at 24, 25, or otherwise formed with portions beyond the flat plane thereof in line with the protuberances 11, 12 so as to dispose the latter outwardly and downwardly as shown in Figs. 2 and 7, the parts being so proportioned that when the fastener is threaded into the member 14 and the head 19 of the fastener is thus brought down against the plate, the plate protuberances will be forced downwardly against the slope of the slotted portion 13 or 13' inwardly and into tight engagement with the threaded stem of the fastener, thus self-locking the parts together as shown in Figs. 4 and 9. The greater the pressure of head 19 against plate 10 the tighter the binding of the protuberances 11, 12 against the threads.

The slotted portions 13, 13' of the members 14, 14' which are to receive the protuberances 11 and 12 of the plate 10 are preferably downwardly tapered into the threaded portions 18, 18' and the protuberances 11, 12 may be similarly downwardly tapered and so proportioned that when the fastener 17 is threaded into member 14 or 14', the protuberances will move into the threaded stem of the fastener 17 and the stem will actually cut threads therein (Figs. 4 and 9) and thus securely self-lock the parts together automatically. The device may be used not only in connection with fasteners secured to members such as illustrated at 14, 14' of the drawing, but in any application or other situations for which bolts and screws are useful wherein it is desired to secure one part to another.

Fig. 4 illustrates the application of the invention to a convenient fastener arrangement wherein two articles 15, 16 are to be secured together, the first article being provided with a slotted portion 13' (Fig. 5) opening into the threaded portion 18' of the second article 16. In the form shown in Figs. 6–9, the locking device is used in connection with member 14 which in turn may be passed through an aperture 30 of one article 31 and into threaded engagement with the opening 32 of a second article 33; the member 14 is formed as shown in the drawings, with the slotted portion 13 above mentioned and with a head 34 proportioned to be larger than and covering the aperture 30 of the first article 31, and with a threaded portion 18 opening into an unthreaded portion 35 weakened as at 36 (Fig. 6) and proportioned so as to be normally of less diameter than unthreaded extended end 37 of the stem 22. Thus, when engaged as shown in Fig. 9, said unthreaded, weakened portion 36 of the member 14 will be expanded beyond the diameter of aperture 32 as noted at 38, Fig. 9, to hold the parts together in fully locked relation.

In the form of invention shown in Fig. 7, the plate 10 is positioned in the member 14, with the protuberances 11 and 12 disposed in the slotted portion 13 of the member 14, said slotted portion 13 opening into the threaded portion 18 of member 14. The member 14 may be provided with a recessed portion 39 (Fig. 6) at the head 34 thereof in registry with the slot 13, to receive the head portion 19 of the fastener when the parts are assembled as above described and shown in Fig. 9.

The protuberances 11 and 12 may, as shown in Fig. 3, be arcuately formed at their ends next to the plate aperture 23, as noted at 40, 41 in Figs. 2 and 3, to generally conform to the contour of the threaded stem 22 of the fastener 17.

The invention, as will be noted from the above, consists essentially in the provision of the plate 10 having the protuberances 20, 21 for disposition in and cooperation with a slotted portion opening into a threaded member to receive the fastener device, which may be of any convenient or desired type.

While, as shown in the various figures of the drawings, the invention is applied to fasteners, primarily, for securing members together, it will be apparent that it is equally useful in many other situations for some other end, as, for example, to hermetically seal openings in walls of various members; in such case the walls could be the aggregate 14' having a slotted portion 13' opening into threaded portion 18'. The fastener 17 of Fig. 4 by way of example of another possible embodiment of the invention, might be completely passed through two apertured parts (the upper one slotted to receive protuberances 11, 12), and threadedly engaging a nut member; in that case part 16 might be deemed the nut member thus engaged by the fastener.

The flat plate 10 and its protuberances 11, 12 may be made of any suitable compressible, flexible material and wherever used in this specification and claims, the term "compressible" shall be deemed to include flexible materials.

Having thus described my invention, what I claim as new and desire to secure by Letters Patent is:

1. A device for securing apertured first and second articles together when assembled with their apertures in registration, by applying said device from one side only of said assembled articles, comprising a first fastener member having a head portion greater than the article aperture, an elongated stem extending from said head portion and proportioned to extend through said apertured articles and beyond the opposite side thereof, the extremity of said stem being expansible to engage the opposite side of said assembled articles, to fasten said articles between the head portion and extremity of the first fastener, said stem portion being provided with an axial aperture therethrough and being threaded in the axially apertured portion thereof, a second fastener member adapted to engage said first fastener member to so spread the said extremity of the first fastener member, said second fastener member comprising an enlarged head portion and an elongated stem extending therefrom for reception in said axial aperture, said elongated stem having a threaded portion for engagement with the threaded portion of said axially apertured stem portion of the first fastener member, said elongated stem of the second fastener member proportioned for so engaging said extremity of the stem of the first fastener member, on so threading the stem of the second fastener into said axially threaded portion of the first fastener, said first fastener member having a slotted traversing the upper end of the axial aperture therein, a plate having a pair of protuberances of softer material than the stem of the second fastener member said protuberances being dependently disposed on the plate in aligned, spaced relation and proportioned to conform to said slotted portion, so that the plate may be positioned between the head of the second fastener member and the axial aperture of the first fastener member and the protuberances of the plate disposed in said slotted portion, and, on threading the stem of the second member into the internally threaded axial aperture of the first fastener member, the head portion of the second fastener member will engage the plate and compress the protuberances thereof in said slotted portions and against the stem of the second fastener member, holding the parts in position against displacement.

2. In a device as set forth in claim 1, said extremity of said stem of the first fastener member being provided with slots to facilitate said expansion thereof.

3. In a device as set forth in claim 1, the extremity of said axial aperture in the stem of the first fastener member being of smaller diameter than the diameter of said aperture at the threaded portion thereof, said portion of the stem of the second fastener member engaging said extremity of the axial aperture of the first fastener member being of greater diameter to so engage and expand the extremity of said first fastener member.

4. A device for securing apertured first and second articles together when assembled with their apertures in registration, by applying said device from one side only of said assembled articles, comprising a first fastener member having a head portion greater than the article apertures, an elongated stem extending from said head portion and proportioned to extend through said apertured articles and beyond the opposite side thereof, the extremity of said stem being expansible to engage the opposite side of said assembled articles, to fasten said articles between the head portion and extremity of the first fastener, said stem portion being provided with an axial aperture therethrough and being threaded in the axially apertured portion thereof, a second fastener member adapted to engage said first fastener member to so spread the said extremity of the first fastener member, said second fastener member comprising an enlarged head portion and an elongated stem extending therefrom for reception in said axial aperture, said elongated stem having a threaded portion for engagement with the threaded portion of said axially apertured stem portion of the first fastener member, said elongated stem of the second fastener member proportioned for so engaging said extremity of the stem of the first fastener member, on so threading the stem of the second fastener into said axially threaded portion of the first fastener, said first fastener member having a slotted portion traversing the upper end of the axial aperture therein, a plate having protuberances of softer material than the stem of the second fastener member, said protuberances being dependently disposed on the plate and proportioned to conform to said slotted portion, so that the plate may be positioned between the head of the second fastener member and the axial aperture of the first fastener member and the protuberances of the plate disposed in said slotted portion, and, on threading the stem of the second member into the internally threaded axial aperture of the first fastener member, the head portion of the second fastener member will engage the plate and compress the protuberances thereof in said slotted portion and against the stem of the second fastener member, holding the parts in position against displacement.

References Cited in the file of this patent

UNITED STATES PATENTS

| | | |
|---|---|---|
| 547,988 | Bull | Oct. 15, 1895 |
| 1,308,672 | Hennessy | July 1, 1919 |
| 1,400,387 | Stroh | Dec. 13, 1921 |
| 1,598,165 | Stevenson | Aug. 31, 1926 |
| 1,720,799 | McLaughlin | July 16, 1929 |
| 2,378,071 | Ericsson | June 12, 1945 |
| 2,479,075 | Martin | Aug. 16, 1949 |

FOREIGN PATENTS

| | | |
|---|---|---|
| 682,820 | Great Britain | Nov. 19, 1952 |